UNITED STATES PATENT OFFICE.

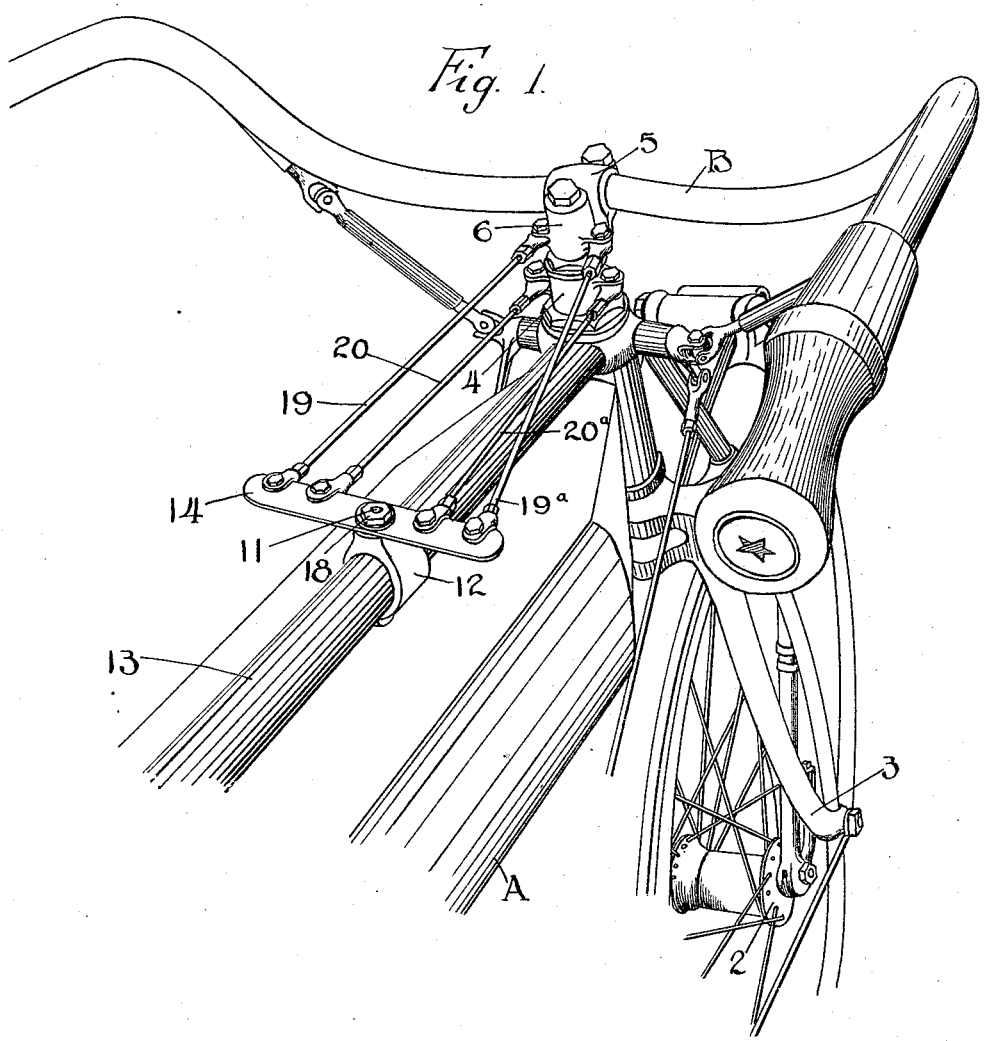

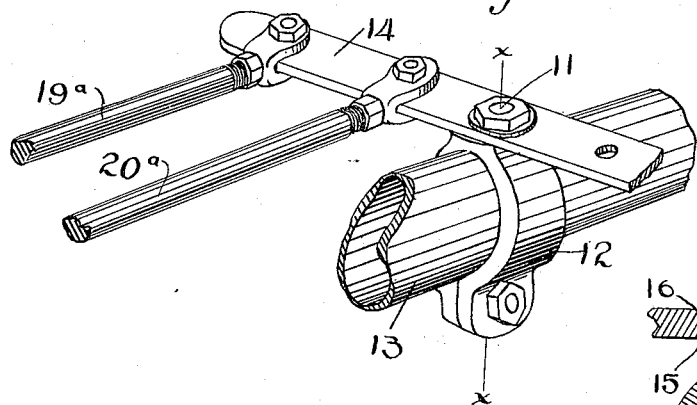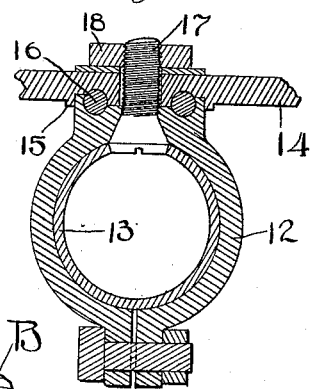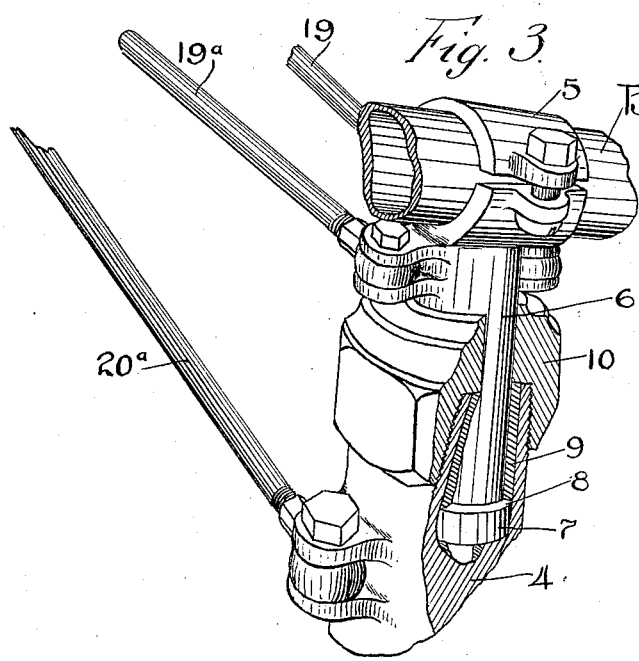

JOHN P. HANDY, OF LONG PRAIRIE, MINNESOTA.

STEERING-WHEEL CONTROL.

1,132,771.

Specification of Letters Patent. Patented Mar. 23, 1915.

Application filed January 8, 1913. Serial No. 740,756. REISSUED.

*To all whom it may concern:*

Be it known that I, JOHN P. HANDY, a citizen of the United States, residing at Long Prairie, in the county of Todd and State of Minnesota, have invented certain new and useful Improvements in Steering-Wheel Control, of which the following is a specification.

My invention relates to improvements in steering control for the front wheels of motor cycles, bicycles, etc., and consists in the features of construction and combination hereinafter described and claimed.

In the accompanying drawings forming part of this specification, Figure 1 is a perspective view of the front end of a motor cycle fitted with my improvements; Fig. 2 is a detail view, broken away, of an equalizing bar forming part of the controlling mechanism; Fig. 3 is a detail view, broken away, of the fork head and handle bar and connected controlling mechanism; and Fig. 4 is a section on line $x$—$x$ of Fig. 2.

Referring to the drawings, A represents the framework of an ordinary motor cycle.

2 represents the front wheel journaled in the lower end of the fork 3, the fork head 4 having suitable rotatable support in the front end of the frame.

B represents an ordinary handle bar slidably supported in a split collar 5 forming the top of the post 6. The post 6, as shown in Fig. 3, is rotatably supported in the upper end of the fork head. As one method of securing the post 6 in the fork head, I show the post at its lower end formed with a surrounding flange 7 fitted in the opening 8 in the top of the fork head and secured in position by a sleeve 9 fitted in the opening 8 above the flange 7. Over the top of the fork head is screwed a suitable crown collar 10 holding the parts connected.

For the purpose of turning the fork head from the handle bar, I provide the following mechanism: Having pivotal support 11 upon the collar 12 secured around the top bar 13 of the frame is a cross bar 14. The cross bar is shown formed with a circumferential rib 15 extending downwardly around the top of the collar 12. Balls 16 are positioned between the cross bar and collar and fitted into runways therein. The cross bar is secured in position through the medium of a bolt 17 extending upwardly from the frame bar, a nut 18 being threaded upon the upper end of the bolt. The outer ends of the cross bar are connected with the post of the handle bar by rods 19 and 19$^a$, said rods having pivotal connection with said cross bar and post. The cross bar is also connected with the head of the fork by similar rods 20 and 20$^a$ offset inwardly inside the rods 19 and 19$^a$.

In operation, when the handle bar is turned in steering the machine the fork head and supported front wheel will be similarly turned through the medium of the cross bar and connecting rods. By reason of the rods 20 and 20$^a$ being positioned closer to the fulcrum of the cross bar than the rods 19 and 19$^a$, it will be evident that there will be less turning of the fork head than of the handle bar. It thus becomes easier to steer the front wheel, particularly where the same is being driven through sand, etc., than in the ordinary construction, where the fork head is turned directly from the handle bar.

I claim as my invention:

1. In a machine of the class described, comprising a frame, a steering wheel and handle bar, means for controlling the steering wheel from the handle bar, comprising independent rotatable supports for the steering wheel and handle bar in alinement with each other, a leverage connection between the handle bar and steering wheel supports, and intermediate anchorage for said connection upon the frame of the machine back of the handle bar.

2. In combination with a machine of the class described, comprising a frame, steering wheel, and handle bar, means for controlling the steering wheel from the handle bar, comprising independent rotatable supports for the steering wheel and handle bar, an equalizing cross bar supported by the frame, and leverage connections between said cross bar and said handle bar and steering wheel supports.

3. In combination with a machine of the class described, comprising a frame, a steering wheel, and handle bar, means for controlling the steering wheel from the handle bar, comprising independent rotatable supports for the wheel and handle bar, a cross bar fulcrumed upon the frame, and relatively offset connections between said cross bar and steering wheel and handle bar supports.

4. In combination with a machine of the class described, comprising a frame, a steering wheel, and handle bar, independent rotatable supports for said steering wheel and handle bar, a cross bar fulcrumed upon the frame at the rear of the handle bar, connections between the outer ends of the cross bar and handle bar support, and connections between said cross bar and steering wheel support inwardly offset from said first mentioned connections.

In testimony whereof I affix my signature in presence of two witnesses.

JOHN P. HANDY.

Witnesses:
Wm. E. Lee,
Cornelia Rice.

Copies of this patent may be obtained for five cents each, by addressing the "Commissioner of Patents, Washington, D. C."